US012579780B2

(12) United States Patent
Wang et al.

(10) Patent No.: US 12,579,780 B2
(45) Date of Patent: Mar. 17, 2026

(54) HYPERSPECTRAL TARGET DETECTION METHOD OF BINARY-CLASSIFICATION ENCODER NETWORK BASED ON MOMENTUM UPDATE

(71) Applicant: Dalian Minzu University, Dalian (CN)

(72) Inventors: Liguo Wang, Dalian (CN); Xiaoyi Wang, Dalian (CN); Danfeng Liu, Dalian (CN); Haitao Liu, Dalian (CN); Ying Xiao, Dalian (CN)

(73) Assignee: Dalian Minzu University, Dalian (CN)

( * ) Notice: Subject to any disclaimer, the term of this patent is extended or adjusted under 35 U.S.C. 154(b) by 382 days.

(21) Appl. No.: 18/454,949

(22) Filed: Aug. 24, 2023

(65) Prior Publication Data

US 2024/0386699 A1    Nov. 21, 2024

(30) Foreign Application Priority Data

May 17, 2023    (CN) .......................... 202310554705.7

(51) Int. Cl.
| | |
|---|---|
| *G06V 10/762* | (2022.01) |
| *G06T 7/194* | (2017.01) |
| *G06V 10/44* | (2022.01) |
| *G06V 10/764* | (2022.01) |

(52) U.S. Cl.
CPC ............ *G06V 10/762* (2022.01); *G06T 7/194* (2017.01); *G06V 10/44* (2022.01); *G06V 10/764* (2022.01); *G06T 2207/10036* (2013.01); *G06V 2201/07* (2022.01)

(58) Field of Classification Search
CPC ........... G06T 7/194; G06T 2207/10036; G06T 2207/20081; G06T 2207/20084; G06T 2207/30188; G06T 7/11; G06V 10/762; G06V 10/44; G06V 10/764; G06V 2201/07; G06V 10/58; G06V 10/763; G06V 10/82; G06V 20/13; G06V 20/194; G06V 10/761;

(Continued)

(56) References Cited

U.S. PATENT DOCUMENTS

| | | | | |
|---|---|---|---|---|
| 10,878,345 | B2 * | 12/2020 | Lekivetz | ................. G06F 18/22 |
| 11,074,483 | B2 * | 7/2021 | Morgan | ................ G06F 18/213 |

(Continued)

*Primary Examiner* — Jonathan S Lee
*Assistant Examiner* — D J Dhooge
(74) *Attorney, Agent, or Firm* — Pilloff Passino & Cosenza LLP; Rachel K. Pilloff; Sean A. Passino

(57) ABSTRACT

A hyperspectral target detection method of a binary-classification encoder network based on a momentum update is provided, and includes following steps: converting an acquired 3-D hyperspectral image into a hyperspectral image in a 2-D matrix form, performing a clustering to obtain a clustering result, and initializing a centroid; based on the clustering result, using Euclidean distance to find pixels adjacent to each centroid as pure background pixels and target pixels, and screening pure pixels; constructing a background-target training sample set based on the pure pixels, constructing a binary-classification encoder network based on a momentum update through the background-target training sample set, calculating a loss function, and optimizing to obtain a trained binary-classification encoder network; inputting the hyperspectral image in the 2-D matrix form into the trained binary-classification encoder network, and outputting a final detection map.

8 Claims, 13 Drawing Sheets

(58) Field of Classification Search
CPC . G06F 18/23213; Y02A 40/10; G06N 3/0455;
G06N 3/082; G06N 3/084
See application file for complete search history.

(56) References Cited

U.S. PATENT DOCUMENTS

| | | | | |
|---|---|---|---|---|
| 2010/0111396 | A1* | 5/2010 | Boucheron | G06F 18/29 |
| | | | | 382/133 |
| 2022/0383630 | A1* | 12/2022 | Beyer | G06N 3/09 |
| 2024/0346800 | A1* | 10/2024 | Kwong | G06V 10/56 |

* cited by examiner

HYPERSPECTRAL TARGET DETECTION METHOD OF BINARY-CLASSIFICATION ENCODER NETWORK BASED ON MOMENTUM UPDATE

CROSS-REFERENCE TO RELATED APPLICATIONS

This application claims priority to Chinese Patent Application No. 202310554705.7, filed on May 17, 2023, the contents of which are hereby incorporated by reference.

TECHNICAL FIELD

The application relates to a technical field of remote sensing image processing, and in particular to a hyperspectral target detection method of a binary-classification encoder network based on a momentum update.

BACKGROUND

Compared with optical single-channel detection systems such as visible light, infrared light and ultraviolet light, a hyperspectral imager is capable of obtaining continuous spectral curves reflecting target characteristics. Hyperspectral images obtained by the hyperspectral imager is featured in high spectral resolution, "spectrum integration" and many spectral channels, and continuous imaging within the imaging range. The targets, which could not be effectively detected in multispectral remote sensing images, could be better detected and identified in hyperspectral remote sensing images thanks for the extremely high spectral resolution, which could reach the nanometer level. The hyperspectral images are widely used in classification, unmixing, target detection and change detection.

The target detection is one of the important applications in the field of hyperspectral remote sensing image processing. According to prior and non-prior target spectra, the target detection may be divided into supervised and unsupervised forms. The unsupervised form is also called anomaly detection. The supervised form is usually called target detection or target matching. Hyperspectral target detection is widely used in military reconnaissance, geological exploration, environment and agricultural monitoring.

Classical target detection algorithms are mainly classified into three categories: probability distribution model, subspace model and representation model. Typical probability distribution models include Constrained Energy Minimization (CEM) and Adaptive Coherence Estimator (ACE). A typical subspace model is Orthogonal Subspace Projection (OSP). Typical representation models include Sparse Representation-Based Binary Hypothesis (SRBBH) detector and Sparse and Low-Rank Matrix Decomposition (SLRMD) model. Because of spectral variation and mixed pixel problems, classical algorithms usually fail to fully separate the background from the target, therefore resulting in low detection rates and high false alarm rates.

In recent years, the theory of deep learning has been developed rapidly, and the research of hyperspectral target detection method based on deep learning has been widely concerned. In the deep learning, it is generally required that the number of samples should be sufficient. The more samples, the better the effect of the trained model and the stronger its generalization ability. However, in practice, although there is prior spectral information, the background information is unknown, and usually there are only 1-5 pieces of prior spectral information, so conditions are not met to train the model.

Under this background, the application proposes a hyperspectral target detection method of a binary-classification encoder network based on a momentum update.

SUMMARY

The purpose of the present application is to provide a hyperspectral target detection method of a binary-classification encoder network based on a momentum update in order to overcome defects of the prior art.

In order to achieve the above object, the application provides a hyperspectral target detection method of a binary-classification encoder network based on a momentum update, including following steps:

converting an acquired 3-D hyperspectral image into a hyperspectral image in a 2-D matrix form, clustering the hyperspectral image in the 2-D matrix form, and initializing a centroid of the hyperspectral image in the 2-D matrix form;

screening pure pixels by Euclidean Distance based on a clustering result, where the pure pixels include background class pixels and target class pixels;

constructing a background-target training sample set based on the pure pixels, constructing a binary-classification encoder network based on a momentum update through the background-target training sample set, calculating a loss function, and optimizing the binary-classification encoder network to obtain a trained binary-classification encoder network; and inputting the hyperspectral image in the 2-D matrix form into the trained binary encoder network, and outputting a final detection map.

Optionally, the hyperspectral image in the 2-D matrix form is clustered, and the centroid of the hyperspectral image in the 2-D matrix form is initialized, including:

using k-means as a clustering method, setting a value of k, randomly selecting $k-1$ pixels from the hyperspectral image in the 2-D matrix form as an initial centroid, and setting known target spectral information $t_p$ as a k-th centroid; and calculating a Euclidean distance from each pixel in the hyperspectral image in the 2-D matrix form to k centroids, and dividing pixels being calculated into a class corresponding to a centroid with a smallest distance, using a mean value within the class as a new centroids of the corresponding class, and not updating a centroid of a k-th class until a termination condition is reached, and completing the clustering to obtain a clustered centroid.

Optionally, the pure pixels are screened, including:

screening pixels within a preset distance range from each centroid based on the Euclidean distance, and respectively selecting a fixed number of the background class pixels and the target class pixels to define a potential pure pixel sample set, including:

background pixels $PB=[b_{c1-1}, \ldots, b_{c1-50}; b_{c2-1}, \ldots, b_{c2-50}; \ldots; b_{c(k-1)-1}, \ldots, b_{c(k-1)-50}]$ and target pixels $PT=[t_1, \ldots, t_{10}]$.

Optionally, the background-target training sample set is constructed, including:

linearly mixing pixel by pixel based on the background pixels, the target pixels and the known target spectral information $t_p$, generating target training samples;

mixing pixels in the background pixels one by one according to a preset ratio to generate background training samples; and mixing the target training samples and the background training samples, disrupting an order, and respectively setting labels on the target training samples and the background training samples to obtain the background-target training sample set.

Optionally, the binary-classification encoder network based on the momentum update includes:

a first feature encoder used for outputting hidden layer features of the cluster centroid;

a second feature encoder used for outputting hidden layer features of the samples; and the binary-classification encoder used for outputting binary classification probability values corresponding to samples;

where the first feature encoder, the second feature encoder and the binary-classification encoder are all composed of four fully connected layers, the first feature encoder and the second feature encoder have a same network structure, the first feature encoder is connected in parallel with the second feature encoder, and the second feature encoder and the second classification encoder are connected in series.

Optionally, the loss function is calculated, including:

optimizing the binary-classification encoder network based on the momentum update by means of back propagation and momentum update, inputting the samples and the clustered centroid into the binary-classification encoder network based on the momentum update, and calculating a binary cross entropy loss of the binary classification probability values and the labels, and a triplet loss of the hidden layer features of the cluster centroid and the hidden layer features of output samples to obtain a total loss function.

Optionally, the binary cross entropy loss is:

$$L_{bce} = -\left[s_i \cdot \log(p_i) + (1-s_i) \cdot \log(1-p_i)\right]$$

where $s_i$ is the label of the sample, the target is 1, and the background is 0, and $p_i$ is a predicted probability; a function of the triplet loss is:

$$L_{tri}(A, P, N) = \max\left(\|A - P\|_2^2 - \|A - N\|_2^2 + a, 0\right)$$

where A is a sample feature, P and N are a positive example and a negative example corresponding to A, and a is a boundary threshold separating the positive example and the negative example.

Optionally, the total loss function $L_{total}$ is:

$$L_{total} = L_{bce} + L_{tri}.$$

Optionally, the binary-classification encoder network is optimized, including:

feeding back the total loss function to the second feature encoder and the binary-classification encoder, and optimizing parameters of the second feature encoder and the binary-classification encoder by means of the back propagation, and parameters of the first feature encoder are propagated by the second feature encoder by means of the momentum update.

Compared with the prior art, the application has following advantages and technical effects:

First, the application proposes a sample augmentation strategy suitable for a hyperspectral target detection, which may not only extract pure background and target samples, but also give consideration to mixed pixels; and second, the application utilizes the deep learning theory to mine deep features of data and enhance a recognition ability for the target, that is, to improve a detection rate; and takes the hyperspectral target detection as a binary-classification, so as to effectively suppress the false alarm rate.

BRIEF DESCRIPTION OF THE DRAWINGS

The accompanying drawings, which constitute a part of this application, are used to provide a further understanding of this application. The illustrative embodiments of this application and their descriptions are used to explain this application, and do not constitute an improper limitation of this application. In the attached drawings:

FIG. 4A is a pseudo-color map of hyperspectral images; FIG. 4B is a reference map; FIG. 4C is CEM; FIG. 4D is ACE; FIG. 4E is OSP; FIG. 4F is SRBBH; FIG. 4G is SLRMD; and FIG. 4H is the method proposed in the present application.

FIG. 5A is a (FPR,TPR) curve; FIG. 5B is a ($\tau$,FPR) curve.

DETAILED DESCRIPTION OF THE EMBODIMENTS

It should be noted that embodiments in this application and features in the embodiments could be combined with each other without conflicts. The present application is described in detail with reference to the attached drawings and embodiments.

It should be noted that steps shown in the flowchart of the accompanying drawings may be executed in a computer system such as a set of computer-executable instructions, and although the logical order is shown in the flowchart, in some cases, steps shown or described may be executed in a different order from here.

Figure 1:
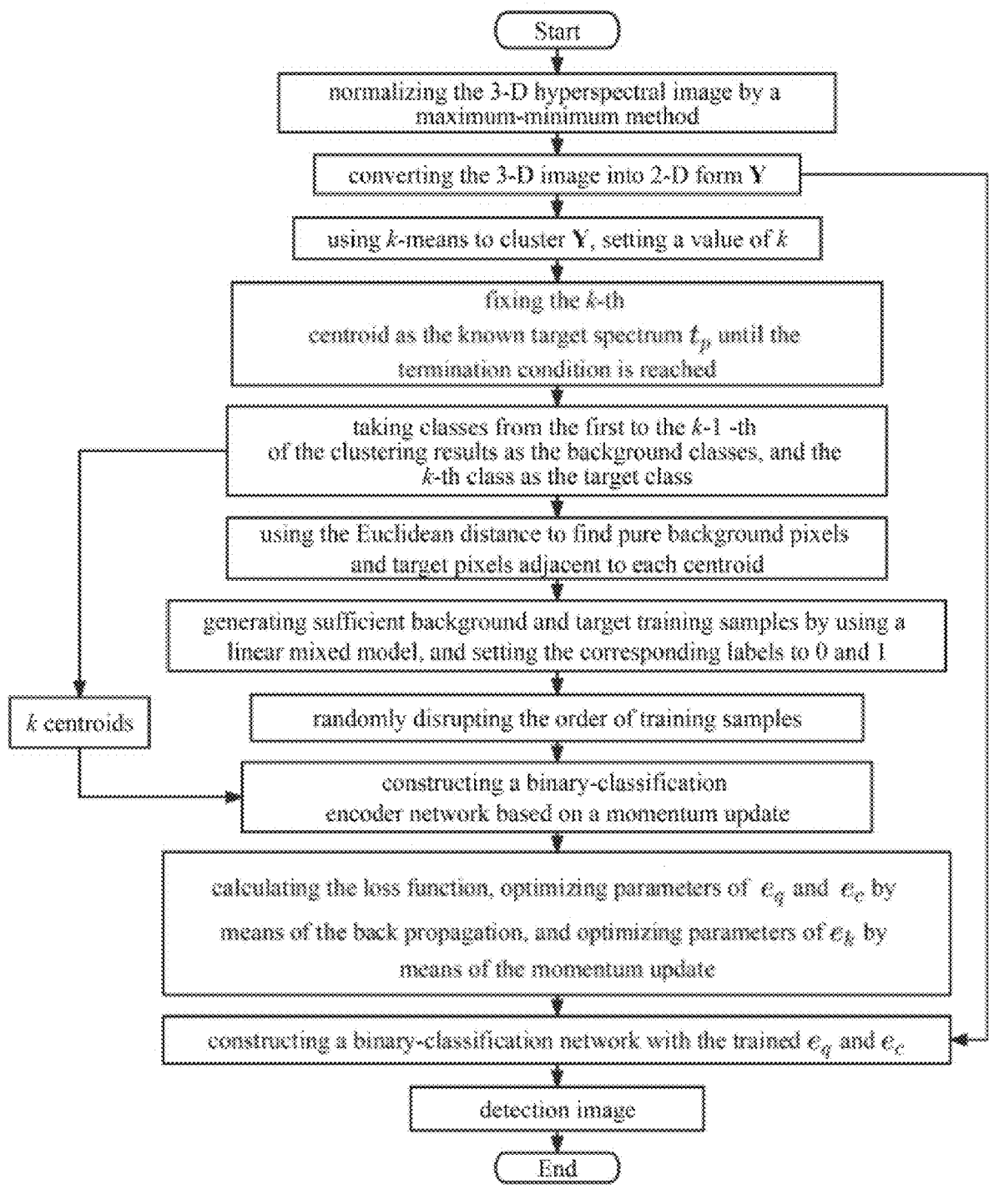
FIG. 1 is a flowchart of a hyperspectral target detection method of a binary-classification encoder network based on a momentum update according to an embodiment of the present application.

The application provides a hyperspectral target detection method of a binary-classification encoder network based on a momentum update, as shown in FIG. 1.

Firstly, formulating a model, assuming a 3-D hyperspectral image $Y \in R^{H \times W \times D}$, where H, W and D respectively represent the height, width and number of bands of the image. Normalizing the 3-D hyperspectral image by a maximum-minimum method;

$$Y = \frac{Y - \min(Y)}{\max(Y) - \min(Y)}$$

and expanding into a hyperspectral image $Y=[y_1, y_2, \ldots, y_i, \ldots, y_l] \in R^{D \times L}$ in a 2-D matrix form, where $L=H \times W$, representing a total number of pixels in the image.

Step 1: initializing a centroid. Using k-means to cluster Y. Setting a value of k, which is 8 in this embodiment. Randomly selecting k−1 pixels from Y as an initial centroid, and taking known target spectral information $t_p$ as a k-th centroid.

Step 2: completing the clustering. Calculating the Euclidean distance from each pixel $y_j$ in Y to k centroids $c_j$ (j=1, . . . , k), and a calculation formula is:

$$d(y_i, c_j) = \sqrt{(y_i - c_j)^2};$$

and dividing into the class corresponding to the centroid with the smallest distance. In each obtained class, an intra-class average is used as its new centroid, and the centroid of the k-th class is not updated. Repeating the above process until the termination condition (The number of iterations or the minimum error changes) is reached.

Step 3, screening pure pixels (the pure pixels are pixels containing only one type of terrain). According to the clustering results obtained in the step 2, assuming that the first to k−1-th classes are background classes and the k-th class is target class. Using the Euclidean distance to find the pixels adjacent to each centroid as pure background pixels and target pixels. Where 50 pixels are selected for each of the background classes and 10 pixels are selected for the target class. Defining respectively potential pure pixel sample sets as background pixels:

$$PB = [b_{c1-1}, \ldots, b_{c1-50}; b_{c2-1}, \ldots, b_{c2-50}; \ldots; b_{c(k-1)-1}, \ldots, b_{c(k-1)-50}]$$

and target pixels PT=[$t_1$, . . . , $t_{10}$].

Figure 2:
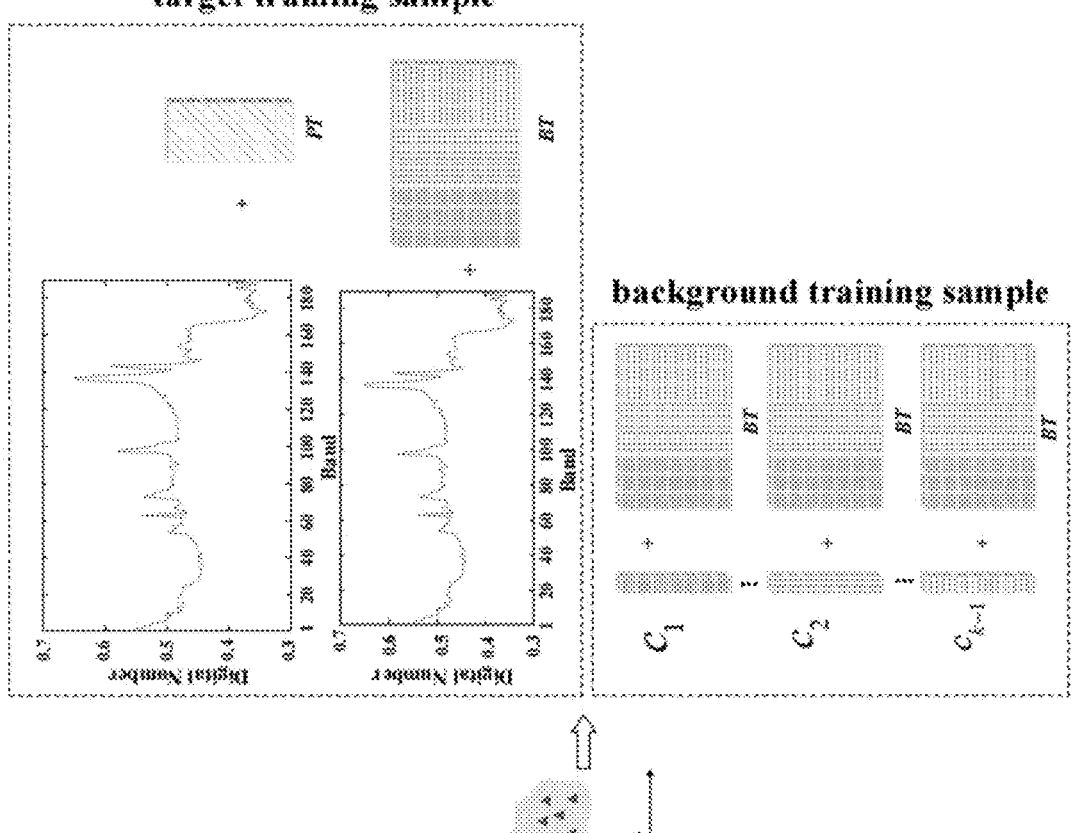
FIG. 2 is a schematic diagram of a training sample construction method based on a clustering and linear mixed model according to an embodiment of the present application.
Figure 2:
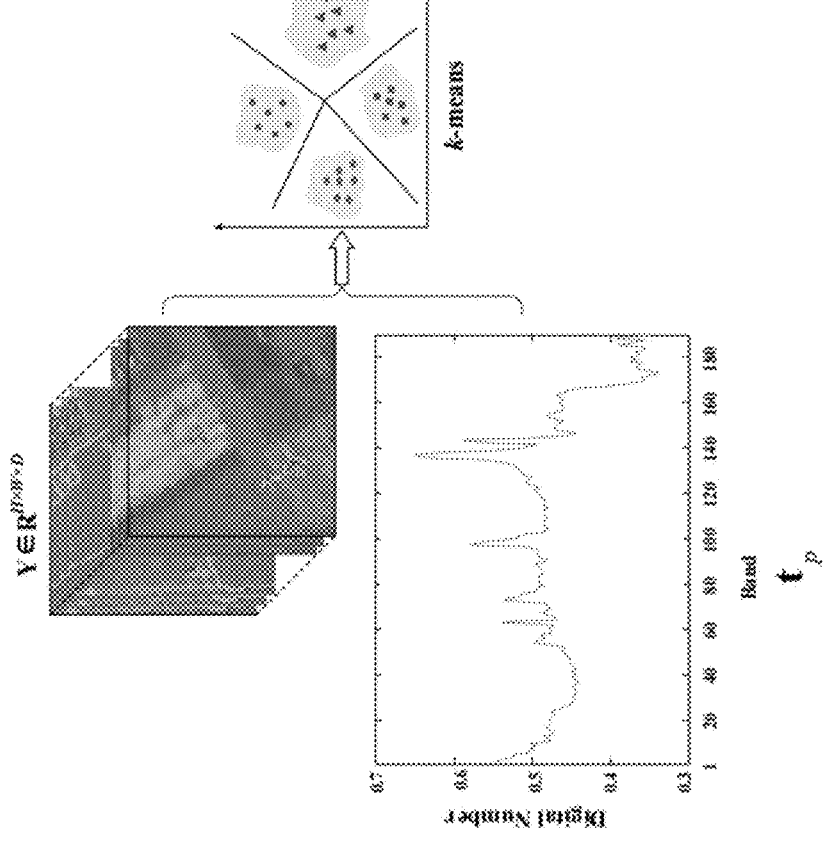

Step 4, constructing a background-target training sample, as shown in FIG. 2.

linearly mixing PB, PT and $t_p$ to generate sufficient background-target training samples. The specific operation is as follows:

1) constructing a target training sample: linearly mixing the known target spectral information $t_p$ with PB and PT pixel by pixel, according to a ratio of R=[0.01, 0.02, . . . , 0.1], and generated the target sample as follows:

$$samplet_i = (1 - r) \cdot t_p + r \cdot x_i$$

$$x_i \in PT \cup PB$$

2) constructing background training samples: mixing the pixels in the PB one by one according to the proportion P, and generated background samples are as follows:

$$sampleb_i = (1 - r) \cdot b_j + r \cdot b_k$$

$$b_j, b_k \in PB,$$

$$j \neq k$$

Figure 3:
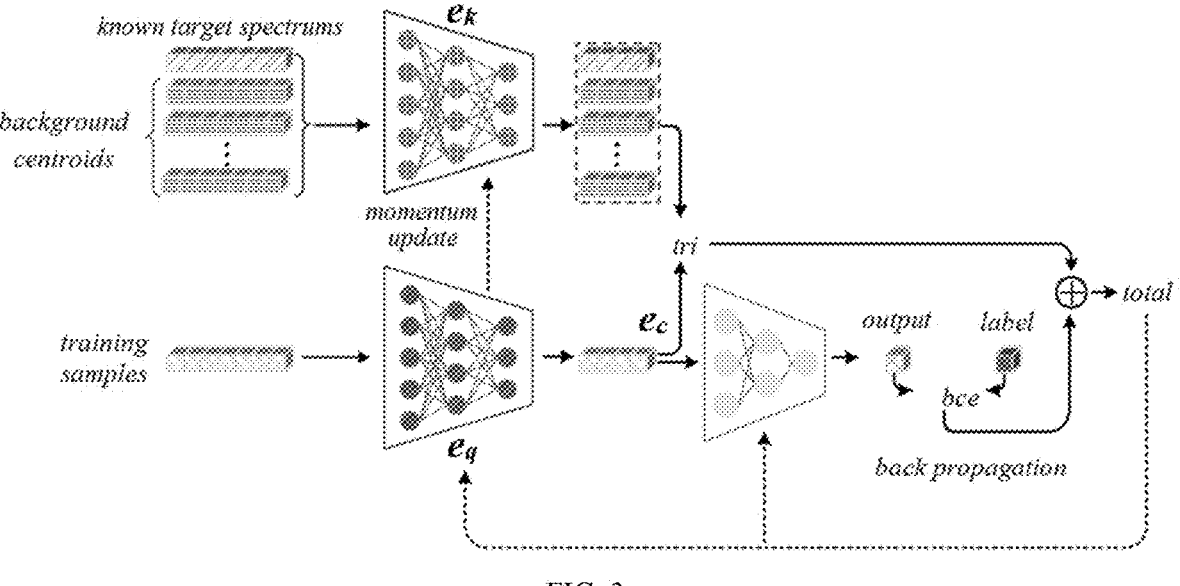
FIG. 3 is a schematic diagram of the binary-classification encoder network based on the momentum update according to an embodiment of the present application.

Finally, the training sample set is the target set SampleT and the background set SampleB. And setting the label of SampleT to 1 and the label of SampleB to 0. Mixing and disordering the target training samples and the background training samples, and setting the training parameter batch size, which is 256 in this embodiment; and step 5, constructing the binary-classification encoder network based on the momentum update. FIG. 3 is the binary-classification encoder network based on the momentum update implemented by the present application. The network consists of three encoders, respectively a feature encoder $e_k$ and a feature encoder $e_q$, and a binary-classification encoder $e_c$. Each encoder consists of fully connected layers and an activation function.

In this embodiment, the Sigmoid function is used as the activation function. The Sigmoid function is as follows:

$$Sigmoid(x) = \frac{1}{1 + e^{-x}}$$

$e_k$, $e_q$ and $e_c$ are composed of four fully connected layers. $e_k$ and $e_q$ have the same network structure with sizes of (D-500, 500-500, 500-500, 500-32). The size of $e_c$ is (32-128, 128-64, 64-32, 32-1).

Step 6: calculating the loss function and optimizing the model by means of back propagation and momentum update. Inputting the samples and the clustered centroid obtained in the step 2 into the binary-classification encoder network, and the encoder $e_k$ outputs the hidden layer features P∪N of the clustered centroid, the encoder $e_q$ outputs the hidden layer features A of the samples, and the encoder $e_c$ outputs the binary classification probability values corresponding to the samples. Calculating a binary cross entropy loss of probability values and labels and a triplet loss of P∪N and A.

Specifically, a function of the binary cross entropy loss is:

$$L_{bce} = -[s_i \cdot \log(p_i) + (1 - s_i) \cdot \log(1 - p_i)]$$

where $s_i$ is the label of the sample, the target is 1, and the background is 0, and $p_i$ is a predicted probability; a function of the triplet loss is:

$$L_{tri}(A, P, N) = \max(\|A - P\|_2^2 - \|A - N\|_2^2 + a, 0);$$

in the above formula, A is a sample feature, and P and N are a positive example and a negative example corresponding to A.

When the sample label is 1, the target centroid is positive and the background centroid is negative; when the sample label is 0, the background centroid is positive and the target centroid is negative. a refers to a boundary threshold separating the positive example from the negative example when the comparison occurs. In this embodiment, a=0.2.

The total loss function is:

$$L_{total} = L_{bce} + L_{tri};$$

feeding back the loss function to $e_q$ and $e_c$, and optimizing parameters of $e_q$ and $e_c$ by means of the back propagation. Parameters of $e_k$ are propagated by $e_q$ through the momentum update, and the calculation method is as follows:

$$\lambda \theta_k + (1 - \lambda)\theta_q \to \theta_k$$

where $\theta_k$ and $\theta_q$ represent respectively the parameters of $e_q$ and $e_k$, in this embodiment, $\lambda = 0.8$.

Step 7: generating a detection map. Constructing a binary-classification network with the trained $e_q$ and $e_c$, inputting Y into the model, and outputting a final detection map.

In order to illustrate an effectiveness of the present application, a following experiment is conducted.

Firstly, a hyperspectral data set used in the experiment: San Diego airport data is introduced. The dataset is acquired by Airborne Visible/Infrared Imaging Spectrometer at San Diego Airport, California. The image size is 100×100×189, and the spatial resolution is 3.5 meters. The target is three planes.

Figure 4A:
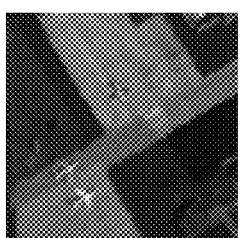
FIG. 4A, FIG. 4B, FIG. 4C, FIG. 4D, FIG. 4E, FIG. 4F, FIG. 4G, and FIG. 4H show comparison diagrams between the method of the present application and five other benchmark methods.
Figure 4B:
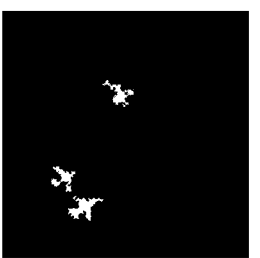
Figure 4C:
Figure 4D:
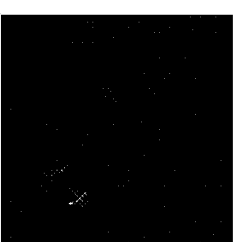
Figure 4E:
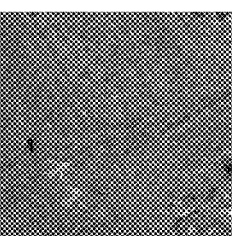
Figure 4F:
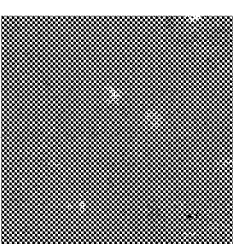
Figure 4G:
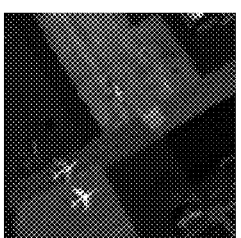
Figure 4H:
Figure 5A:
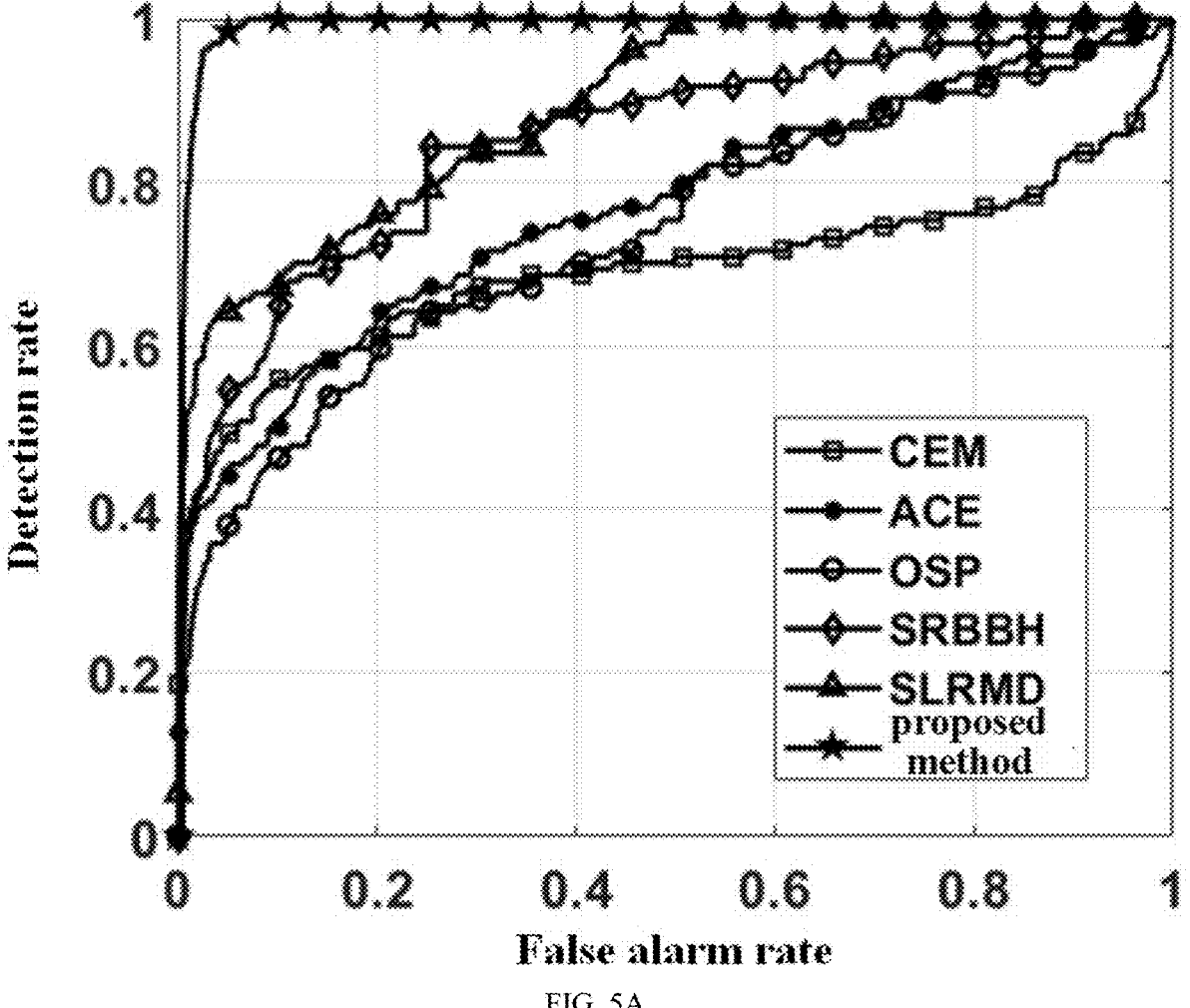
FIG. 5A and FIG. 5B show graphs of 2-D ROC $(P_f, P_d)/(\tau, P_f)$ using the method of the present application and the five other benchmark methods.
Figure 5B:
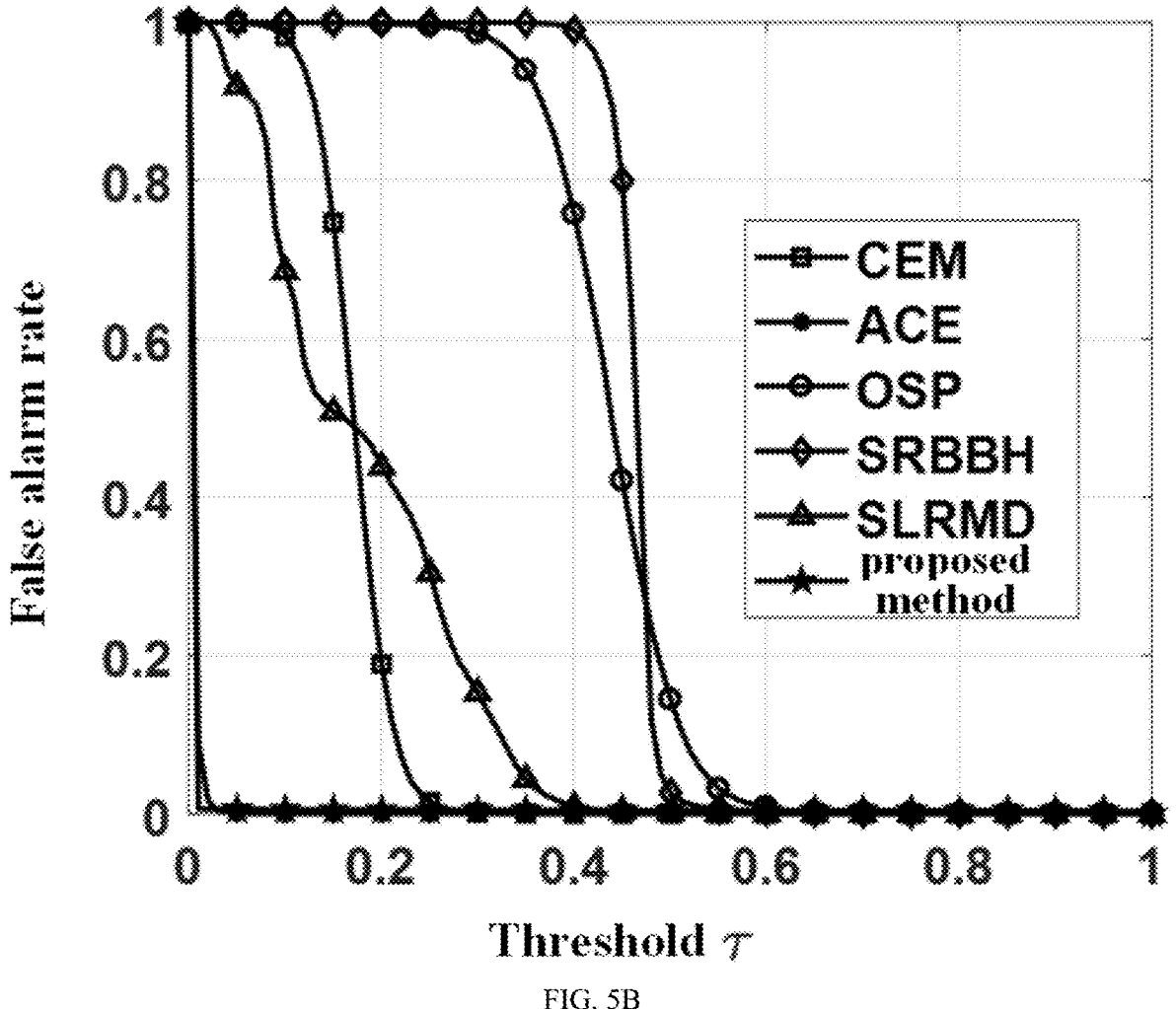

Using CEM, ACE, OSP, SRBBH and SLRMD as benchmark methods, FIG. 4A, FIG. 4B, FIG. 4C, FIG. 4D, FIG. 4E, FIG. 4F, FIG. 4G, and FIG. 4H show the pseudo-color map and reference map of the San Diego airport data set, and the comparison diagrams between the proposed method and five benchmark methods, where FIG. 4A is a pseudo-color map of hyperspectral images; FIG. 4B is a reference map; FIG. 4C is CEM; FIG. 4D is ACE; FIG. 4E is OSP; FIG. 4F is SRBBH; FIG. 4G is SLRMD; and FIG. 4H is the method proposed in the present application. By detection images, it can be seen that the method proposed by the application has higher detection rate and may suppress the background better. In order to further quantify the detection accuracy of several target detection methods, this embodiment uses ROC (receiver operating characteristic) curve and AUC (Area Under Curve) as detection indicators. ROC curve includes two versions, ROC (FPR, TPR) and ROC (T, FPR). Where FPR (False Positive Rate), TPR (true positive rate) and τ represent false alarm, detection rate and threshold respectively. AUC value is the area under ROC curve. As shown in FIG. 5A and FIG. 5B (where FIG. 5A is the (FPR, TPR) curve and FIG. 5B is the (τ, FPR) curve) and Table 1 and Table 2, Table 1 shows the comparison of AUC (FPR, TPR) values of the proposed method and the five benchmark methods, and Table 2 shows the AUC (τ,FPR) values of the proposed method and the five benchmark methods.

TABLE 1

| CEM | ACE | OSP | SRRBH | SLRMD | The proposed method |
|------|------|------|--------|--------|-----------------|
| 0.6931 | 0.7700 | 0.7400 | 0.8559 | 0.8928 | 0.9940 |

TABLE 2

| CEM | ACE | OSP | SRRBH | SLRMD | The proposed method |
|------|------|------|--------|--------|-----------------|
| 0.1716 | 0.0062 | 0.4393 | 0.4634 | 0.1797 | 0.0098 |

The anomaly detection method provided by the application may obtain a higher detection accuracy and a lower false alarm rate, and the detection rates are respectively increased by 0.3009, 0.2240, 0.2540, 0.1381 and 0.1012 compared with CEM, ACE, OSP, SRBBH and SLRMD. Although slightly higher than the false alarm rate of ACE, the false alarm rate of the proposed method is still 0.1618, 0.4295, 0.4536 and 0.1699 lower than that of CEM, OSP, SRBBH and SLRMD.

The above is only the preferred embodiment of this application, but the protection scope of this application is not limited to this. Any change or replacement that may be easily thought of by a person familiar with this technical field within the technical scope disclosed in this application should be included in the protection scope of this application. Therefore, the protection scope of this application should be based on the protection scope of the claims.

What is claimed is:

1. A hyperspectral target detection method of a binary-classification encoder network based on a momentum update, comprising:

converting an acquired 3-D hyperspectral image into a hyperspectral image in a 2-D matrix form, clustering the hyperspectral image in the 2-D matrix form, and initializing a centroid of the hyperspectral image in the 2-D matrix form;

screening pure pixels by a Euclidean distance based on a clustering result, wherein the pure pixels comprise background class pixels and target class pixels;

constructing a background-target training sample set based on the pure pixels, constructing a binary-classification encoder network based on a momentum update through the background-target training sample set, calculating a loss function, and optimizing the binary-classification encoder network to obtain a trained binary-classification encoder network; and inputting the hyperspectral image in the 2-D matrix form into the trained binary encoder network, and outputting a final detection map;

the binary-classification encoder network based on the momentum update comprises:

a first feature encoder used for outputting hidden layer features of the cluster centroid;

a second feature encoder used for outputting hidden layer features of the samples; and the binary-classification encoder used for outputting binary classification probability values corresponding to samples;

wherein the first feature encoder, the second feature encoder and the binary-classification encoder are all composed of four fully connected layers, the first feature encoder and the second feature encoder have a same network structure, the first feature encoder is connected in parallel with the second feature encoder, and the second feature encoder and the binary-classification encoder are connected in series.

2. The hyperspectral target detection method of a binary-classification encoder network based on a momentum update according to claim 1, wherein the clustering the hyperspectral image in the 2-D matrix form, and initializing the centroid of the hyperspectral image in the 2-D matrix form comprises:

using k-means as a clustering method, setting a value of k, randomly selecting k−1 pixels from the hyperspectral image in the 2-D matrix form as an initial centroid, and setting known target spectral information $t_p$ as a k-th centroid; and calculating the Euclidean distance from each pixel in the hyperspectral image in the 2-D matrix form to k centroids, and dividing pixels being calculated into a class corresponding to a centroid with a smallest distance, using a mean value within the class as a new centroids of the corresponding class, and not updating a centroid of a k-th class until a termination condition is reached, and completing the clustering to obtain a clustered centroid.

3. The hyperspectral target detection method of a binary-classification encoder network based on a momentum update according to claim 2, wherein the screening the pure pixels comprises:

screening pixels within a preset distance range from each centroid based on the Euclidean distance, and respectively selecting a fixed number of the background class pixels and the target class pixels to define a potential pure pixel sample set, comprising:

background pixels $$PB = [b_{c1-1}, \ldots, b_{c1-50}; b_{c2-1}, \ldots, b_{c2-50}; \ldots; b_{c(k-1)-1}, \ldots, b_{c(k-1)-50}]$$

and target pixels PT=[$t_1$, . . . , $t_{10}$].

4. The hyperspectral target detection method of a binary-classification encoder network based on a momentum update according to claim 3, wherein the constructing the background-target training sample set comprises:

linearly mixing pixel by pixel based on the background pixels, the target pixels and the known target spectral information $t_p$, generating target training samples;

mixing pixels in the background pixels one by one according to a preset ratio to generate background training samples; and mixing the target training samples and the background training samples, disrupting an order, and respectively setting labels on the target training samples and the background training samples to obtain the background-target training sample set.

5. The hyperspectral target detection method of a binary-classification encoder network based on a momentum update according to claim 1, wherein the calculating the loss function comprises:

optimizing the binary-classification encoder network based on the momentum update by means of back propagation and momentum update, inputting the samples and the clustered centroid into the binary-classification encoder network based on the momentum update, and calculating a binary cross entropy loss of the binary classification probability values and the labels, and a triplet loss of the hidden layer features of the cluster centroid and the hidden layer features of output samples to obtain a total loss function.

6. The hyperspectral target detection method of a binary-classification encoder network based on a momentum update according to claim 5, wherein the binary cross entropy loss is:

$$L_{bce} = -[s_i \cdot \log(p_i) + (1 - s_i) \cdot \log(1 - p_i)]$$

$s_i$ is the label of the sample, the target is 1, the background is 0, and $p_i$ is a predicted probability;
    a function of the triplet loss is:

$$L_{tn}(A, P, N) = \max(|A - P|_2^2 - |A - N|_2^2 + a, \ 0),$$

and
    A is a sample feature, P and N are a positive example and a negative example corresponding to A, and a is a boundary threshold separating the positive example and the negative example.

7. The hyperspectral target detection method of a binary-classification encoder network based on a momentum update according to claim 5, wherein the total loss function $L_{total}$ is:

$$L_{total} = L_{bce} + L_{tri}.$$

8. The hyperspectral target detection method of a binary-classification encoder network based on a momentum update according to claim 7, wherein the optimizing the binary-classification encoder network comprises:

feeding back the total loss function to the second feature encoder and the binary-classification encoder, and optimizing parameters of the second feature encoder and the binary-classification encoder by means of the back propagation, and parameters of the first feature encoder are propagated by the second feature encoder by means of the momentum update.

* * * * *